July 25, 1933.  A. P. BALL  1,920,052
SEAT CONSTRUCTION
Filed May 26, 1930   3 Sheets-Sheet 1
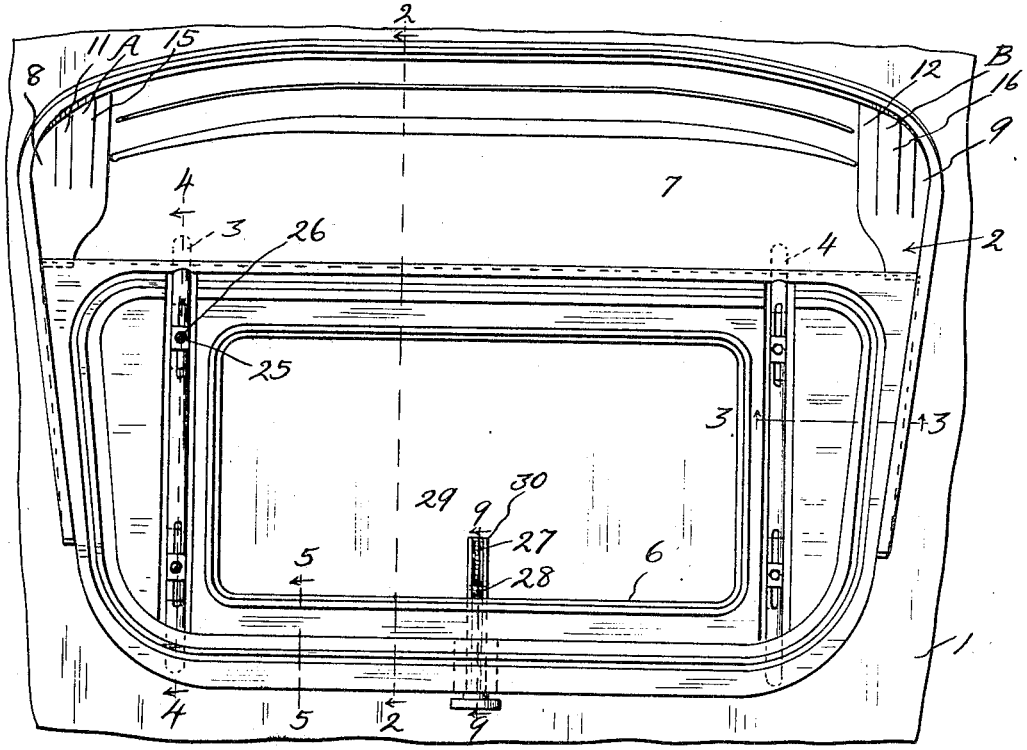
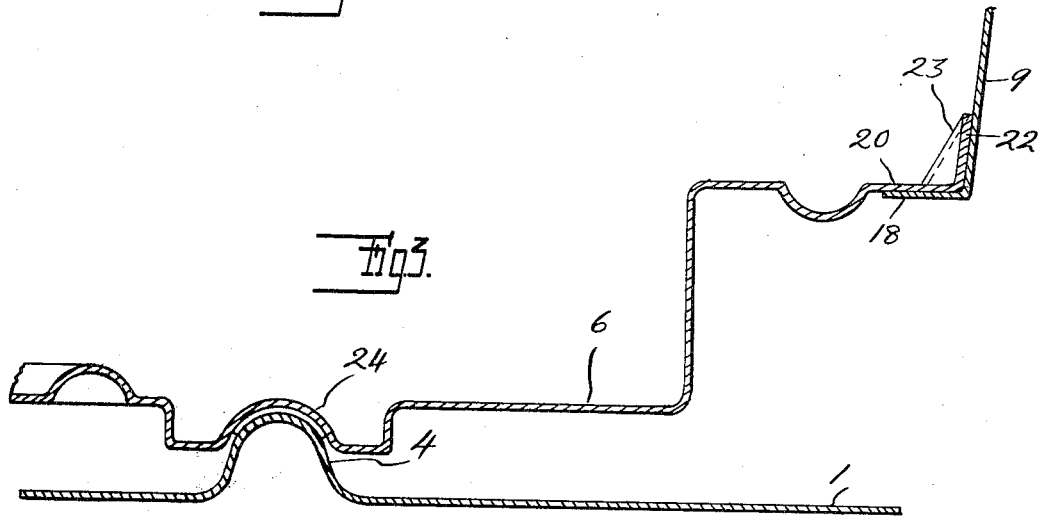
INVENTOR
Albert P. Ball
BY
Whittemore, Hulbert, Whittemore & Belknap
ATTORNEYS July 25, 1933.  A. P. BALL  1,920,052
SEAT CONSTRUCTION
Filed May 26, 1930  3 Sheets-Sheet 2
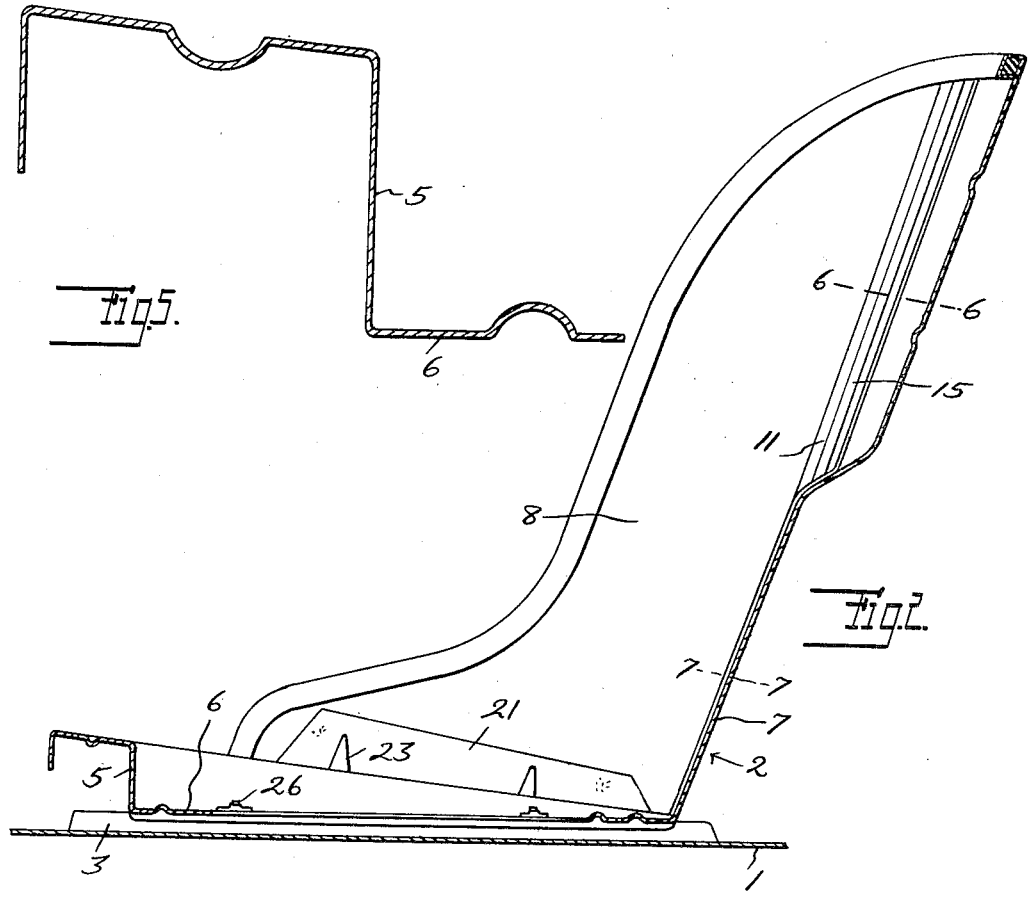
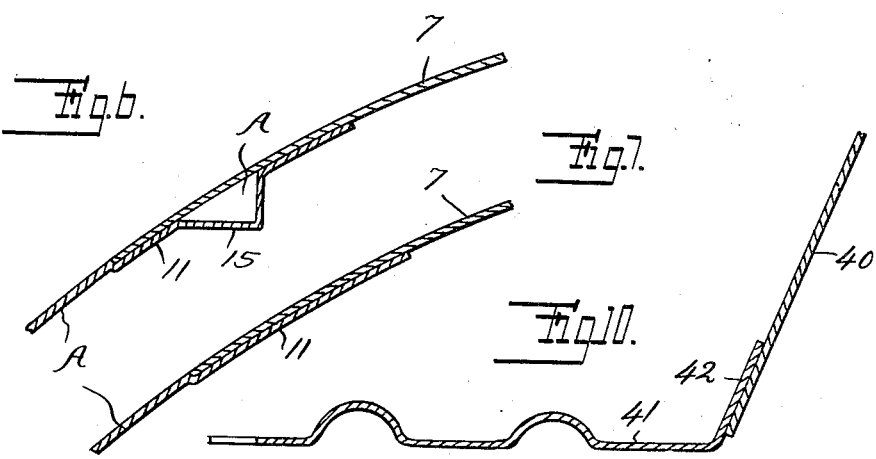
INVENTOR
Albert P. Ball
BY
ATTORNEYS July 25, 1933.  A. P. BALL  1,920,052
SEAT CONSTRUCTION
Filed May 26, 1930  3 Sheets-Sheet 3
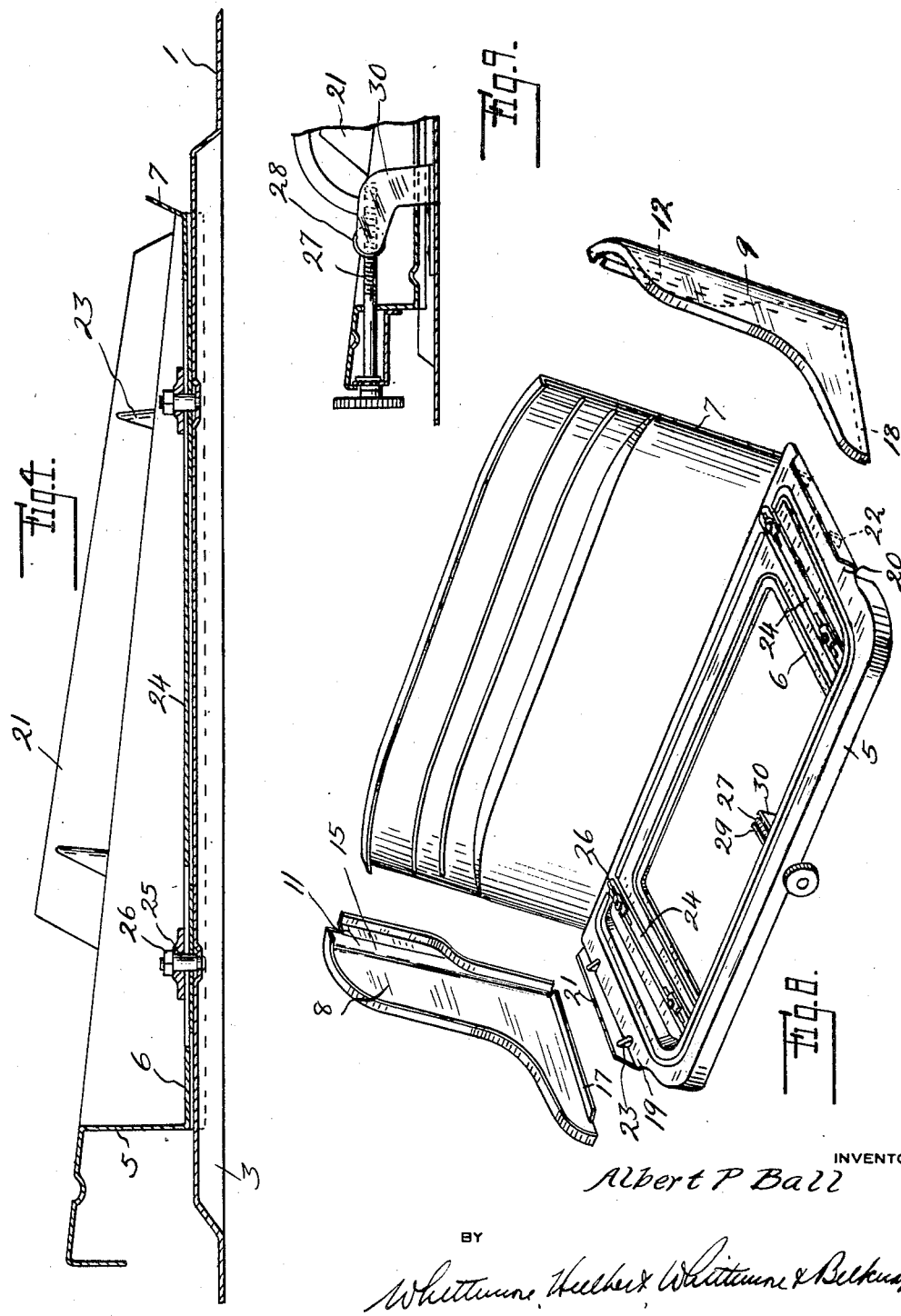
INVENTOR
Albert P Ball
BY
Whittemore, Hulbert, Whittemore & Belknap
ATTORNEYS Patented July 25, 1933

1,920,052

UNITED STATES PATENT OFFICE

ALBERT P. BALL, OF DETROIT, MICHIGAN, ASSIGNOR TO BRIGGS MANUFACTURING COMPANY, OF DETROIT, MICHIGAN, A CORPORATION OF MICHIGAN

SEAT CONSTRUCTION

Application filed May 26, 1930. Serial No. 455,821.

This invention relates generally to seat constructions and refers more particularly to seats designed for use in vehicle bodies.

Heretofore the frames and the back and side panels of seats have been formed separately, in some instances of different materials. Moreover, the seat frames have been devoid of risers. As a result connections had to be made between the seat risers and frames and between the latter and the back and side panels. Consequently many parts such as screws, bolts, nuts, etc., had to be used, and aside from the cost of such parts, considerable time and labor were required to make the several assembly operations.

In the present instance, however, the connections and parts just referred to have been eliminated with a consequent saving of expense. Preferably the seat riser, frame and back panel are formed from a single sheet of metal and the sides are also formed of sheet metal and are secured, preferably by welding, to the back panel and frame. Hence the riser, frame and back and side panels as an integral unit may be mounted as desired upon the flooring of a vehicle body.

In the accompanying drawings:

Figure 1 is a top plan view of a seat assembly embodying my invention;

Figure 2 is a vertical sectional view taken on the line 2—2 of Figure 1;

Figure 3 is a sectional view taken on the line 3—3 of Figure 1;

Figure 4 is a sectional view taken on the line 4—4 of Figure 1;

Figure 5 is a sectional view taken on the line 5—5 of Figure 1;

Figure 6 is a sectional view taken on the line 6—6 of Figure 2;

Figure 7 is a sectional view taken on the line 7—7 of Figure 2;

Figure 8 is a perspective view of the seat with the side panels in spaced relation to the frame and back panel;

Figure 9 is a section on the line 9—9 of Figure 1;

Figure 10 is a vertical sectional view through a slightly modified construction.

Referring now to the drawings, 1 is the flooring of a vehicle body, and 2 is a seat embodying my invention adjustably mounted on said flooring. As shown, the flooring is constructed of sheet metal and has a pair of laterally spaced substantially parallel upwardly embossed channel portions 3 and 4 respectively constituting slides for the seat.

Referring to the seat, 5 is the riser; 6 is the frame; 7 is the back panel; and 8 and 9 respectively are the side panels thereof. Preferably the riser 5, frame 6 and back panel 7 are pressed to the shape shown from a single sheet of metal, while the side panels 8 and 9 respectively are independently formed from sheet metal and are welded to the back panel 7 and frame 6. As illustrated in Figures 6 and 7, the vertical edge portions of the back panel 7 overlap and are welded to offset portions 11 and 12 respectively of the side panels 8 and 9. In fact, the construction is such that the adjacent outer faces of the back and side panels are substantially flush, hence neat connections are provided. Moreover, as illustrated in Figure 6, the offset portions 11 and 12 are provided at their upper ends with vertically extending embossed portions 15 and 16 respectively of substantially V cross section that cooperate with the overlapping portions of the back panel and form vertically extending tubes A and B that stiffen and reinforce the structure. As illustrated in Figures 3 and 8 the side panels 8 and 9 also have inturned flanges 17 and 18 respectively at their lower edges extending beneath and welded to horizontal portions 19 and 20 respectively of the frame. In this connection it will also be noted that vertical portions 21 and 22 respectively extend upwardly from the horizontal portions 19 and 20 and are welded to the side panels 8 and 9, and that spaced embossed portions 23 providing substantially triangular gussets extend between the horizontal and vertical portions 19, 21 and 22 respectively of the frame and stiffen and reinforce the structure.

The frame 6 is otherwise stiffened by longitudinally extending upwardly embossed channel portions 24, and preferably two of these extend longitudinally of and straddle the spaced embossed portions 3 and 4 respectively of the flooring so that the seat may be adjusted longitudinally of the flooring. Any slotted connection including the bolts 25 and nuts 26 may be provided to connect the embossed portions 24 of the seat frame to the embossed portions 3 and 4 respectively of the flooring, and any suitable means such as the screw 27 swiveled in the riser 5 and engaging a nut 28 carried by brackets 29 and 30 respectively on the flooring may be used to accomplish the desired adjustment of the seat. This adjusting mechanism and associated parts is set forth in detail and claimed in a companion applicaton, Serial No. 455,820.

In Figure 10, I have illustrated a slight modification in which the back panel 40 is formed separately from the frame 41. In this construction the back panel 40 overlaps and is welded to an upstanding marginal flange 42 of the frame. Otherwise the structure is the same as illustrated in Figures 1 to 8 inclusive.

Thus from the foregoing description it will be apparent that I have provided a strong and durable structure that is simple in construction. Since the parts are formed from sheet metal they may be accurately pressed to the desired shape and assembled. The integrated structure may be adjustably mounted upon the flooring of a vehicle body, as shown herein, or may be rigidly affixed thereto, as desired.

What I claim as my invention is:

1. In a seat, a pair of side panels having substantially vertically extending embossed portions of substantially V cross section, and a back panel having vertical edge portions secured to said side panels, bridging the embossed portions and forming therewith tubes for stiffening and reinforcing the structure.

2. In a sheet metal seat structure, a seat frame, riser, and back panel formed integrally from a single sheet of metal, said frame being of angular cross section at the sides thereof, and a pair of side panels having angular lower edge portions secured to the angular portions of the frame, and having portions overlapping and secured to the edges of the back panel.

ALBERT P. BALL.